(12) United States Patent
Haugen et al.

(10) Patent No.: US 9,489,458 B1
(45) Date of Patent: Nov. 8, 2016

(54) SUGGESTING INTERACTION AMONG MEMBERS OF A SOCIAL NETWORK

(71) Applicant: Google Inc., Mountain View, CA (US)

(72) Inventors: Frances B. Haugen, Oakland, CA (US); Daniel M. Crichton, Eden Prairie, MN (US)

(73) Assignee: Google Inc., Mountain View, CA (US)

( * ) Notice: Subject to any disclaimer, the term of this patent is extended or adjusted under 35 U.S.C. 154(b) by 56 days.

(21) Appl. No.: 13/630,642

(22) Filed: Sep. 28, 2012

Related U.S. Application Data

(60) Provisional application No. 61/541,968, filed on Sep. 30, 2011.

(51) Int. Cl.
 *G06F 17/30* (2006.01)
(52) U.S. Cl.
 CPC .............................. *G06F 17/30864* (2013.01)
(58) Field of Classification Search
 USPC .......... 707/2, 3, 706; 715/769; 709/204–206
 See application file for complete search history.

(56) References Cited

U.S. PATENT DOCUMENTS

| | | | |
|---|---|---|---|
| 2006/0085788 A1* | 4/2006 | Amir et al. .................... | 718/100 |
| 2007/0204308 A1 | 8/2007 | Nicholas et al. | |
| 2008/0301115 A1* | 12/2008 | Mattox ............. | G06F 17/30864 |
| 2009/0049127 A1 | 2/2009 | Juan et al. | |
| 2009/0150214 A1 | 6/2009 | Mohan | |
| 2009/0164929 A1* | 6/2009 | Chen et al. ........ | G06F 17/30867 715/769 |
| 2010/0146639 A1* | 6/2010 | Kim et al. ...................... | 726/28 |
| 2010/0205541 A1 | 8/2010 | Rapaport et al. | |
| 2011/0010352 A1* | 1/2011 | Jockisch et al. .............. | 707/706 |
| 2011/0246560 A1* | 10/2011 | Gibson .......................... | 709/203 |
| 2012/0078953 A1 | 3/2012 | Araya | |
| 2012/0131032 A1 | 5/2012 | Rakshit | |
| 2012/0278262 A1 | 11/2012 | Morgenstern et al. | |

* cited by examiner

*Primary Examiner* — Etienne Leroux
(74) *Attorney, Agent, or Firm* — Fish & Richardson P.C.

(57) ABSTRACT

Techniques include receiving a search query; determining a topic related to the search query; identifying, within a specific time following receipt of the search query, one or more members of a social network who are available to interact and who are members of a group relating to the topic; and outputting, for use in augmenting a graphical user interface, data corresponding to information about the one or more members. The data can include data for a link to the group on the social network.

20 Claims, 7 Drawing Sheets

SUGGESTING INTERACTION AMONG MEMBERS OF A SOCIAL NETWORK

CROSS-REFERENCE TO RELATED APPLICATION

Priority is hereby claimed to U.S. Provisional Application No. 61/541,968, which was filed on Sep. 30, 2011. The contents of U.S. Provisional Application No. 61/541,968 are hereby incorporated by reference into this disclosure.

BACKGROUND

This disclosure relates generally to suggesting interaction among members of a social network.

Social networks permit users to post information about themselves and to communicate with other people, e.g., their friends, family, and co-workers. Some social networks permit users to create contacts with other users. Additionally, social networks may provide users with opportunities to interact with other users who are on, or outside of, the social network.

SUMMARY

An example of a technique for suggesting interaction among members of a social network may include the following operations: receiving a search query; determining a topic related to the search query; identifying, within a specific time following receipt of the search query, one or more members of a social network who are available to interact and who are members of a group relating to the topic; and outputting, for use in augmenting a graphical user interface, data corresponding to information about the one or more members. The data can include data for a link to the group on the social network.

In the foregoing technique, determining a topic can include performing a search of a search index using the search query to identify candidate topics relating to the search query, and selecting, as the topic, a candidate topic that is deemed to have the most relevance to the search query. Additionally, identifying the one or more members can include determining a first set of members of the social network who have content in common with content entered as part of the search query; determining, from among the members of the first set, a second set of members of the social network who are members of groups relating to the topic; and determining, from among the members of the second set, a third set of members of the social network who are available to interact. Further, in some examples, the foregoing technique can also include ranking the members of the third set, where the data corresponds to information about the one or more members including a ranked list of the members of the third set. The search query can be received from a first member of the social networking service, and the members of the third set can be ranked based on affinity of the members of the third set to the first member on a social graph of the first member; and/or each of the members of the third set can be part of at least one of the groups, and the members of the third set can be ranked based on sizes of corresponding groups.

The foregoing technique can further include outputting, for use in augmenting a graphical user interface, data corresponding to a second search query that relates to the first search query.

Another example of a technique for suggesting interaction among members of a social network may include the following operations: receiving data relating to information about one or more members of a social network; and augmenting a graphical user interface to include the information about the one or more members of the social network. The augmented graphical user interface can include: a field for receiving a first search query; a first display area for displaying information relating to one or more members of a social network who are available to interact and who are members of a group relating to a topic of the first search query; and a second display area for displaying a second search query that is related to the first search query, but that is different from the first search query. The second display area can include a control for initiating a search based on the second search query.

In the foregoing technique, the augmented graphical user interfaces can further include a third display area for displaying information relating to the first search query, and for displaying a control for adding the information to the first search query to an online profile of a member who entered the first search query. The first display area can include a control for initiating an online connection to the one or more members.

Two or more of the features described in this disclosure, including this summary section, may be combined to form embodiments not specifically described herein.

Advantages of the foregoing techniques may include guiding users toward social interaction with one another by providing appropriate user presence/availability information in response to search queries.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DETAILED DESCRIPTION

Described herein are systems and methods for suggesting interaction among members of a social network. The methods, implemented on an appropriate system, can include receiving a search query and determining a topic related to the search query. For example, the system can access a search index and identify various topic candidates associated with the search query. The system can then select from the topic candidates based on predetermined criteria. The methods may also include identifying one or more members of a social network who are available to interact and who are members of a group (e.g., a social or professional group) related to the topic. For example, the system can search member profiles associated with the social network, as well as public information outside of the social network to identify such members. In either case, the system may provide options for members to prevent their personal information from being indexed and searched. If permitted, the system can further include outputting data corresponding to information about the identified members. For example, the system can output information as search query suggestions.

Figure 1:
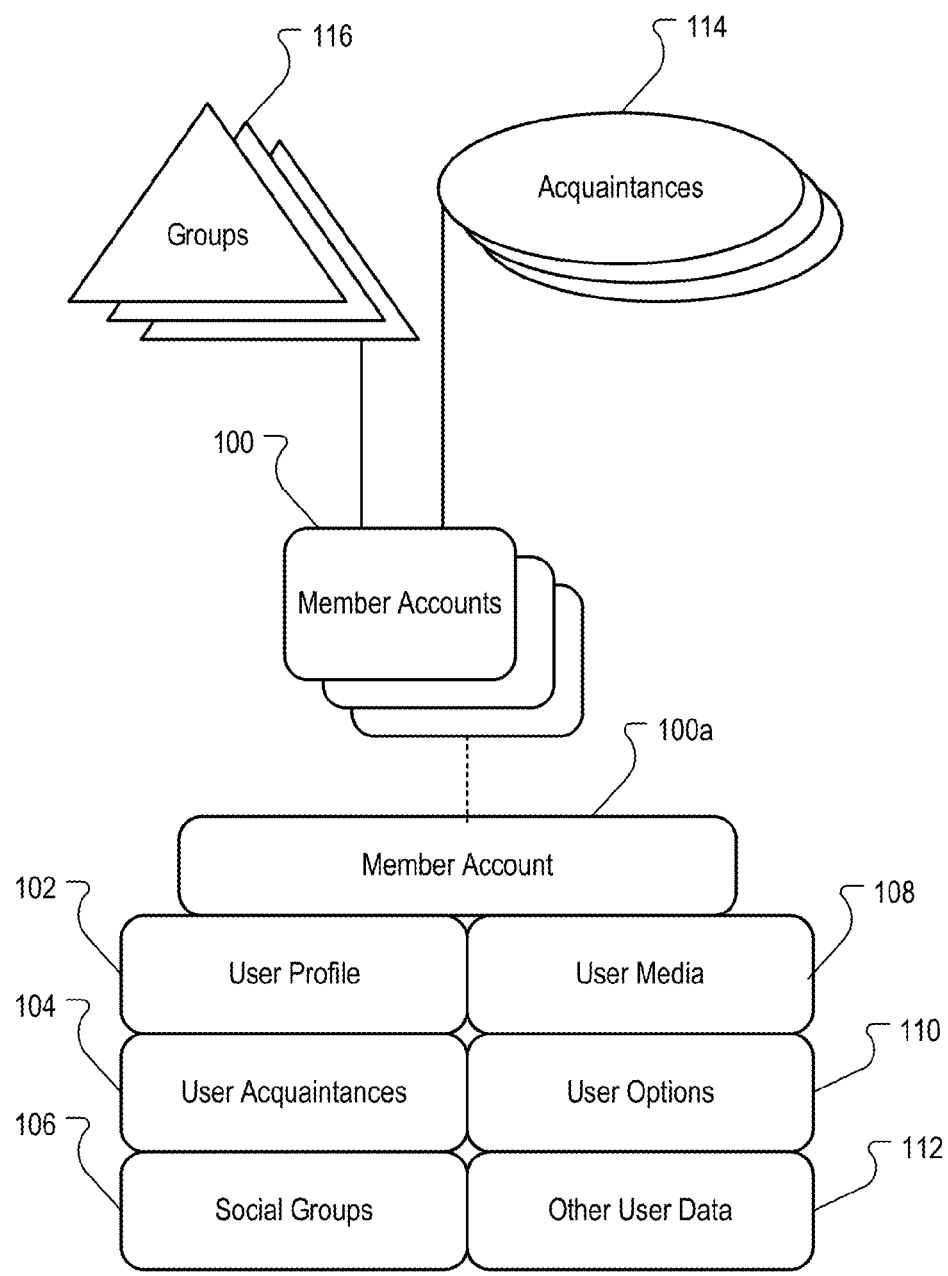
FIG. 1 is a block diagram of an example group of member accounts hosted by a social network.

In some examples, one or more servers can implement the social network. For, examples, the servers can host a number of interconnected member accounts. FIG. 1 is a block diagram of an example group of member accounts 100 hosted by a social networking service. As shown, a member account 100a can, for example, include user profile data 102, user acquaintance data 104, social group data 106, user media data 108, user options data 110, and other user data 112.

User profile data 102 can, for example, include general demographic data about the user associated with the account. User profile data 102 can also include professional information, e.g., occupation, educational background, etc., and other data, e.g., contact information. In some implementations, user profile data 102 can include open profile data, e.g., free-form text that is typed into text fields for various subjects, e.g., "Job Description," "Favorite Foods," etc., and constrained profile data, e.g., binary profile data selected by check boxes, radio buttons, etc., or predefined selectable profile data, e.g., income ranges, zip codes, etc. User profile data 102, or portions thereof, can be classified as public or private profile data, e.g., data that can be shared publicly or data that can be selectively shared. Profile data 102 not classified as private data can, for example, be classified as public data, e.g., data that can be viewed by a user accessing the social network. A user profile may include, for example, an option that a user may select to prevent their member account data from being collected, indexed and searched.

User acquaintances data 104 can, for example, define user acquaintances 114 associated with member account 100a. User acquaintances 114 can include, for example, users associated with other member accounts 100 that are classified as contacts, e.g., member accounts 100 referenced in a "contacts" or "buddies" list. Other acquaintances 114 can also be defined, e.g., professional acquaintances, client acquaintances, family acquaintances, etc. In an implementation, user acquaintance data 104 for member account 100a can, for example, be specified by the user associated with the member account.

The social group data 106 can, for example, define social groups 116 to which member account 100a is associated. Social groups 116 can, for example, define an interest or topic, e.g., "Wine," "Boston Red Sox," "Cooking," etc. Social groups 116 can, for example, be categorized, e.g., a first set of social groups 116 can belong to an "Activities" category, or a second set of social groups 116 can belong to an "Alumni & Schools" category, etc. In some implementations, social groups 116 can include members of the social network that are currently interacting. For example, a social group 116 can include, and identify, a group of social network members that are currently interacting in a video chat room or elsewhere. Members of a social group may, or may not, be acquaintances.

User media data 108 can, for example, include user documents, examples of which are Web pages. A document can, for example, include a file, a combination of files, one or more files with embedded links to other files, etc. The files can be, e.g., text, audio, image, video, hyper-text mark-up language documents, etc. In the context of the Internet, a common document is a Web page.

User options data 110 can, for example, include data specifying user options, e.g., e-mail settings, acquaintance notification settings, chat settings, password and security settings, etc. Other option data can also be included in user options data 110.

The other user data 112 can, for example, include other data associated with member account 100a, e.g., links to other social networks, links to other member accounts 100, online statistics, account payment information for subscription-based social networks, etc. Other data can also be included in the other user data 112.

An example system for suggesting interaction among members of a social network will be described in which a search query for "Red Sox" has been received. In this example, the system may identify various topic candidates, e.g., "baseball", "Boston Red Sox", and "sports." The system may select the topic candidate that is deemed to have the most relevance to the search query, e.g., "Boston Red Sox". In some implementations, other suitable criteria can be used to select a topic from the list of candidates. The system can then identify members of the social network who are available to interact and who are members of a group relating to "Boston Red Sox." For example, if permitted by user account setting(s), the system may search information associated with member accounts on the social network to identify members who are affiliated with social groups relating to the Boston Red Sox. For instance, the system can identify a group of social network members that are currently interacting in a video chat room that is about the Boston Red Sox. With appropriate permission, the system may also search online memberships e.g., fan clubs, season ticket holders, etc. to identify members who are affiliated with social groups. The system can output information about the identified members for use in augmenting a graphical user interface. For example, the system can output the information as search query suggestions that are displayed to the user on a Web page.

The process described above may be implemented in an appropriate network environment, with appropriate devices and computing equipment. An example of such an environment is described below.

Figure 2:
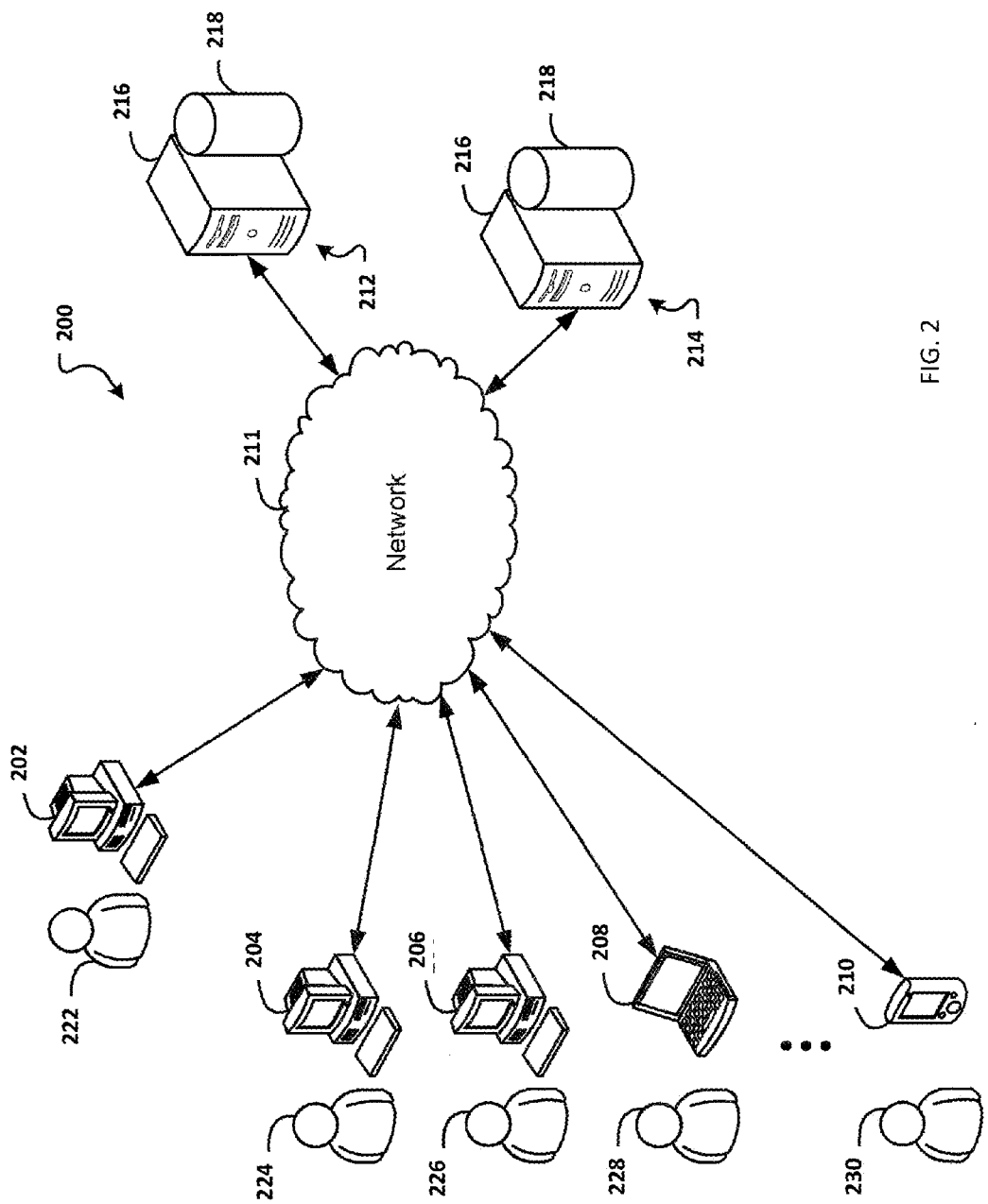
FIG. 2 is a block diagram showing an example network environment on which the process described herein for suggesting interaction among members of a social network may be implemented.

FIG. 2 is a block diagram showing an example network environment on which the processes described herein for suggesting interaction among members of a social network may be implemented. In this regard, FIG. 2 shows an example network environment 200. Network environment 200 includes computing devices 202, 204, 206, 208, 210 that can each communicate with a first server system 212 and/or a second server system 214 over a network 211. Each of computing devices 202, 204, 206, 208, 210, when in use, has a respective user 222, 224, 226, 228, 230 associated therewith. Each of the first and second server systems 212, 214 includes one or more computing devices 216 and a machine-readable repository, or database 218 located in one or more locations. Example environment 200 may include many thousands of Web sites, computing devices and servers, which are not shown.

The network 211 can include a large computer network, e.g., a local area network (LAN), wide area network (WAN), the Internet, a cellular network, or a combination thereof connecting a number of mobile computing devices, fixed computing devices, and server systems. The network(s) may provide for communications under various modes or protocols, e.g., Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a Bluetooth, WiFi, or other such transceiver.

Computing devices 202 to 210 enable respective users 222 to 230 to access and to view documents, e.g., Web pages included in Web sites. Users 222 to 230 can be members of a social networking service. For example, user 222 of computing device 202 can view a Web page using a Web browser. The Web page can be provided to computing device(s) 202 to 210 by server system 212, server system 214 or another server system (not shown). The Web page may be internal to the social networking service or the Web page may be a publicly accessible Web page that is not part of the social networking service.

In example environment 200, computing devices 202, 204, 206 are illustrated as desktop-type computing devices, computing device 208 is illustrated as a laptop-type computing device 208, and computing device 210 is illustrated as a mobile computing device. It is appreciated, however, that computing devices 202 to 210 can each be any type of computing device, examples of which include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of two or more of these data processing devices or other appropriate data processing devices. In some implementations, a computing device can be included as part of a motor vehicle (e.g., an automobile, an emergency vehicle (e.g., fire truck, ambulance), a bus).

Figure 3:
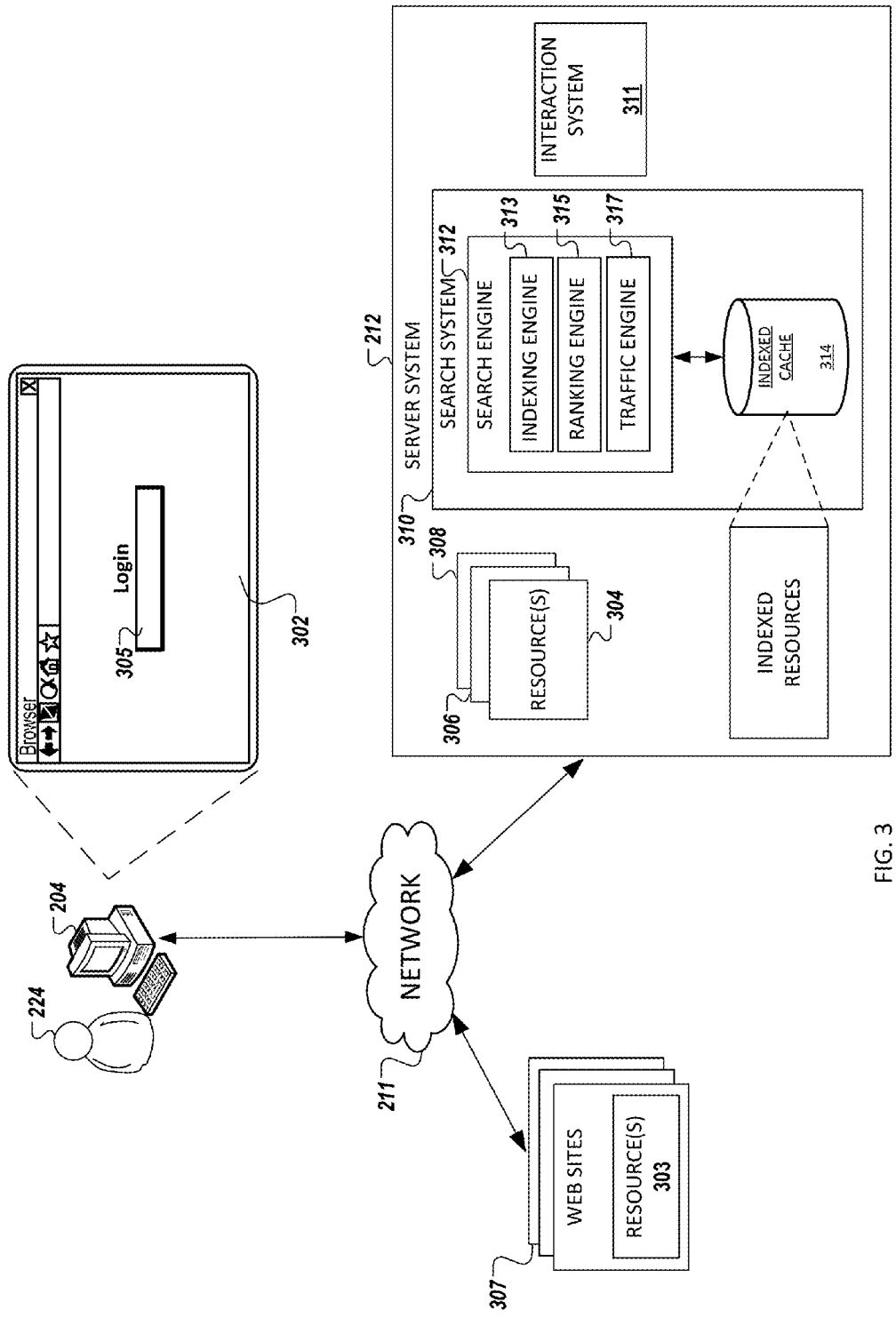
FIG. 3 is a diagram of an example portion of the network environment of FIG. 2 that includes a server system.

FIG. 3 is a diagram of an example portion of the network environment of FIG. 2 that includes server system 212. Server system 212 can include a search system 310 that identifies resources 303 (e.g., Web pages, images, or news articles on the Internet, as well as member accounts hosted by the social networking service, (with appropriate permission) by crawling and indexing resources, e.g., resources provided by content publishers on Web sites 307.

Server system 212 can also include a user interaction system 311 that assists in facilitating online interactions between users 222 to 230. For example, user interaction system 311 can manage real-time chat communications (e.g., instant messaging and/or audio/video conferencing) between two or more users by generating and maintaining online chat rooms (e.g., text or video chat rooms). In some implementations, with appropriate permission, user interaction system 311 can also determine the presence/availability status of users 222 to 230. For example, user interaction system 311 can determine, among other things, whether users 222 to 230 are offline (e.g., not logged-in to the social networking service), currently in a chat room, and/or currently available or unavailable for chatting or other social interaction.

Computing device 204 can communicate with server system 212 and display a Web page 302 provided by server system 212 for accessing a social networking service. In this example, server system 212 stores a plurality of resources 304, 306, 308, each having an associated resource identifier ("Resource ID"). In this example, resources 304, 306, 308 may correspond to different content available from the social networking service. Owners of private content stored on server system 212 may grant permission to have their private content made available to others, e.g., by selecting an option on their user profile.

To view a Web page, user 224 can input or select a Resource ID using a browser that is executing on computing device 204. The Resource ID can include, for example, a uniform resource indicator (URI). A request including the Resource ID is transmitted from computing device 204 to server system 212 over network 211. In response, the server system identifies the requested resource based on the Resource ID, and transmits the requested resource to computing device 204 over network 211. For example, the resource may be a Web page 302, through which a user may access a social networking service. The Web page may include a login field 305 for inputting member account information, e.g., a username and/or password.

The social networking service includes a search system 310 that identifies resources by crawling and indexing those resources. In this regard, search system 310 includes a search engine 312. Search engine 312 can include an indexing engine 313 and a ranking engine 315. Indexing engine 313 is configured to index resources (e.g., discussion topic by subject, discussion topics by tag, member accounts, social media posts, and the like), which may be found in the corpus of the social networking service (e.g., a collection or repository of content) or on publicly-accessible Web sites. An indexed cache 314 stores the index information. A ranking engine 315 (or other software) ranks the resources based on criteria, e.g., popularity. The indexed and, optionally, cached copies of the resources can be stored in an indexed cache 314. In response to an input, search engine 312 can access indexed cache 314 to identify resources that are relevant to the input. Ranking engine 315 ranks the identified resources based, e.g., on popularity or other appropriate criteria.

Figure 4:
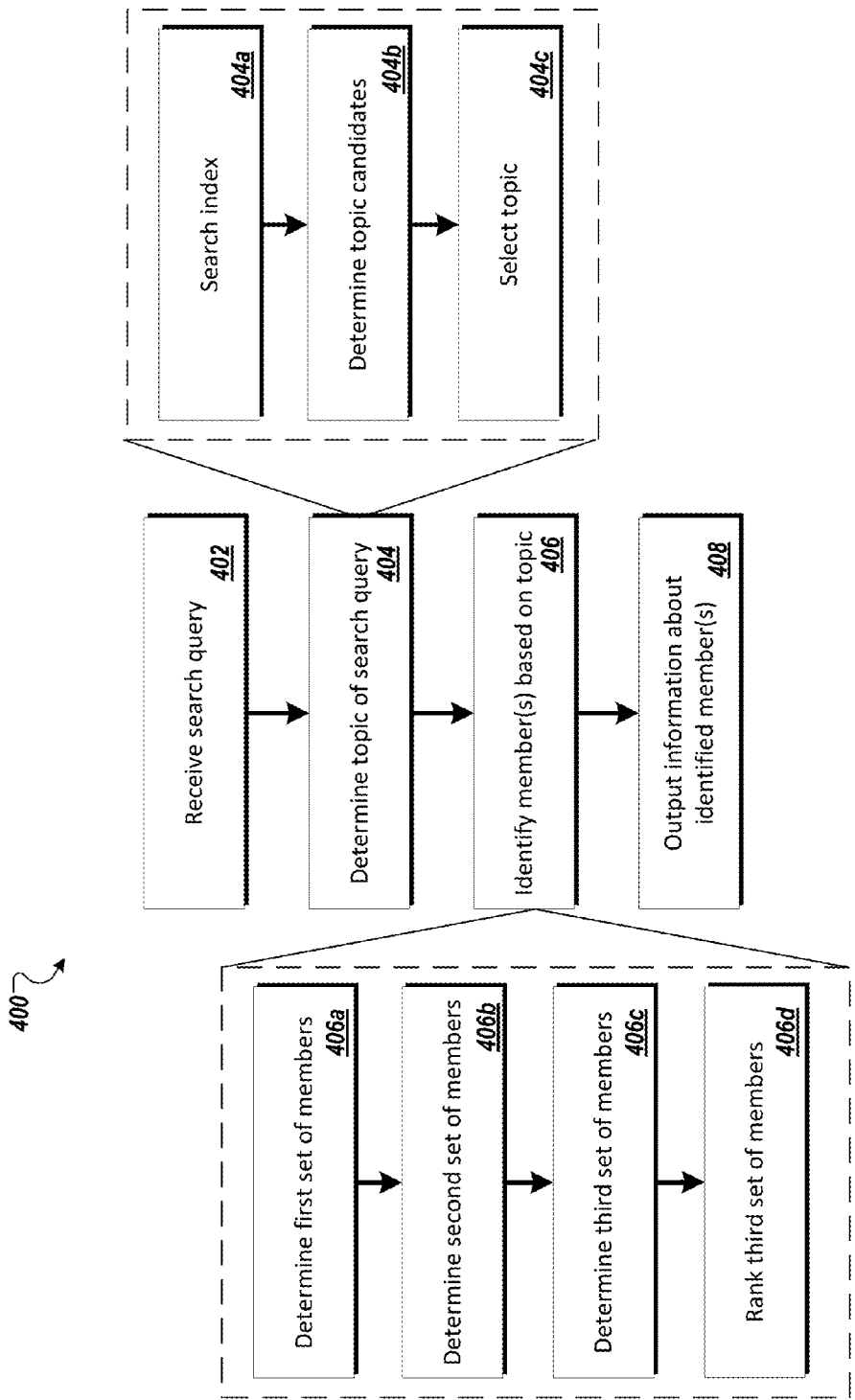
FIG. 4 is a flowchart of an example process for suggesting interaction among members of a social network.

FIG. 4 is a flowchart of an example process 400 for suggesting interaction among members of a social network. Process 400 may be performed by a system of one or more computers in one or more locations, appropriately programmed in accordance with this specification, e.g., by server system 212.

Process 400 receives a search query (402). For example, a user can submit a search query (e.g., text, images, video, audio or other content appropriate for search) to a server system 212 through a network (e.g., network 200). The search query can be informational (covering a general topic, e.g., "Texas" or "football"), navigational (seeking a particular Web site or page, e.g., "National Airlines"), and/or transactional (reflecting the intent of the user to perform a particular action, e.g., "dinner reservations"). The user can enter the search query, e.g., using input components of a computing device, in a search field of a Web page displayed on the user's computing device. The user can then provide an instruction to implement a search based on the query, for example, by selecting a search option on the Web page. In response to the instruction, the computing device outputs the search query to a search engine of a social networking service. In some examples, the search query is received along with a request for query suggestions (e.g., user interaction suggestions, as discussed in detail below).

Process 400 determines a topic associated with the received search query (404). In some implementations, process 400 can search an index (404a) (e.g., indexed cache 314) and identify candidate topics (404b). For example, server system 212 can search the index for matches to the received query (e.g., by implementing a suitable query text, image matching, or other appropriate routine) and reference topic tags associated with the matches in the index to determine topic candidates. Process 400 can select, from the list candidates, a topic for the search query, based, e.g., on one or more prescribed criteria (404c). For instance, server system 212 can determine a topic that is likely most relevant to the search query.

By way of example, an informational search query "Yankees" may be received. In this example, a conventional text matching routine is used to query a search index for matches to the received informational search query "Yankees". Matches in the search index may include content associated with the following topical tags: "sports", "business", and "New York". As such, these topics can be considered topic candidates for the search query "Yankees." Further consider that one-hundred of the matches are tagged with "sports", two-hundred with "business" and three-hundred with "New York." "New York" may be considered the most relevant topic because it is the most popular topical tag of the matches.

Process 400 identifies (406) one or more members of a social network based on the determined topic (404). For example, server system 212 can identify members, within a specific time following receipt of the search query (e.g., within five seconds or within one second), who are available to interact and who are members of a group relating to the topic. In some implementations, social network members can be identified by implementing the operations explained below.

The operations may include determining (406a) a first set of members who have content in common with content entered as part of the search query. For example, members may be identified who have user account data that matches one or more key words, images, video, audio or other content of the search query. As noted above, user account data may include both public information that is listed on a user's profile page and private information that is not published online. Owners of such information may give permission for such information to be made available for searching, or not give permission to have such information available for searching.

The operations may also include determining, from among the members of the first set, a second set of members who are members of groups related to the determined topic (406b). For example, server system 212 can search online social groups) hosted by various social networking services (e.g., social groups 116) to identify members of groups related to the determined topic. With appropriate permissions in place, the server system can also search membership registrations and/or other public records to identify such professional and/or social members. Owners of such information may give permission for such information to be made available for searching, or not give permission to have such information available for searching.

The operations may also include determining, from among the members of the second set, a third set of members who are available to interact socially (406c). For example, as noted above, server system 212 can include user interaction system 311 to facilitate online interactions between users. Interaction system 311 may be operable to determine when members of the social networking service are available for interaction. For instance, interaction system 311 may determine when members are currently in a chat room (e.g., an instant message or video chat room) that is dedicated to the determined topic.

In some implementations, server system 212 can apply rankings to the third set of members (406d). For example, server system 212 may rank members in the third set based on affinity of the members of the third set to the user from whom the search query was received. Members of the third set can also be ranked according to other suitable criteria. For instance, server system 212 may rank the third set of members based on their associated groups (e.g., the number, size, and/or types of topic related groups that they are a member of).

In a social networking context, affinity can identify the closeness of a party to a user. For example, a contact of a contact who has five common middle contacts with the user has more of an affinity with the user (e.g., is considered closer to the user) than a contact of a contact who has only one common middle contact. Factors in determining affinity can include, e.g.: how a contact is connected to the user (e.g., a source of a connection), which social networking site the contact is a member of, whether contact or contact of contact, and how many paths to get to the contact of a contact (e.g., common middle contacts).

Affinity can also be based on the user's interactions with members of a user's social graph (e.g., the frequency of interaction, the type of interaction, and so forth). For example, a user that frequently clicks on posts by a particular contact can be considered to be closer to that contact than with other contacts where they click on respective posts less frequently. Likewise, if a user frequently "mouses-over" content by an author (e.g., a search result link), but does not select that content, the degree of affinity may be less than if the link is selected. Similarly, an amount of time viewing content may be an indicator that one party likes content from another party. The amount of time viewing particular content may be an indication that one party likes only that particular type of content from the other party.

In other examples, affinity can be defined by indirect interaction between users. For example, if two users interact with the same content regularly or frequently, those two users may be considered to have an affinity with each other. In still other examples, if two users interact with the same people regularly or frequently, those two users may be considered to have an affinity with each other.

Affinity can also be greater for particular types of interactions, for example, comments on contact's posts can result in a closer social connection than occasional endorsements. Affinity can change over time. For example, as the types or frequency of interactions change with members of the social graph, the resulting affinities can change as well. A social graph is one way to represent affinity between two parties, which may, or may not, be on the same social network. A social graph is an association of connections among users and content, which may be depicted graphically. Types of connections in social graphs can include, but are not limited to, other users to which a user is in direct contact (e.g., user mail or chat contact, direct contacts on social sites) and users to which the user is in indirect contact (e.g., contacts of contacts, connections of users that have a direct connection to the user). In some examples, a direct connection may be unilateral or bilateral. In some implementations, a social graph includes content generated by individuals (e.g., blog posts, reviews) as connections to the user. The social graph can include connections within a single network or across multiple networks.

With appropriate permissions in place, process 400 outputs data corresponding to information about the one or more identified members (408). For example, server system 212 can output the data to a client device associated with the user, such that the data can be displayed to the user on a Web page. In some examples, the data can be output and subsequently displayed as query suggestions (see Web page 500 of FIG. 5, for example).

Figure 5:
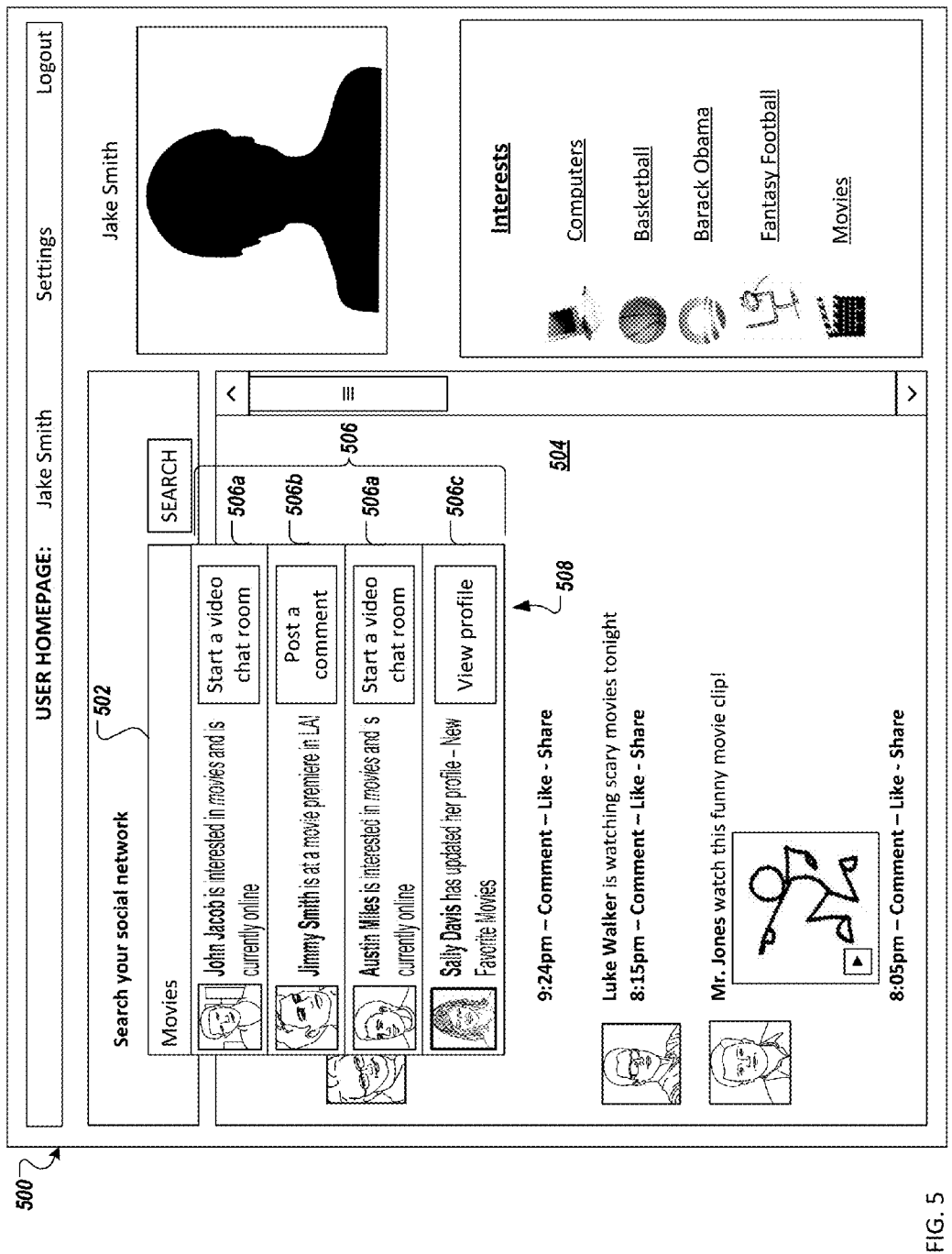
FIG. 5 illustrates a first example Web page that can be displayed on a client device associated with a user.

FIG. 5 illustrates a first example Web page 500 that can be displayed on a client device associated with a user. For example, Web page 500 can be a homepage for a user accessing a social networking service. As shown, Web page 500 includes a query input field 502 that can receive queries from a user, as well as a content stream 504. Content stream 504 may include an appropriate content, e.g., text, video, images, and links available in the corpus. In this example, content stream 504 includes social media posts that have been retrieved and rendered based on the query entered in query input field 502. The content stream may be updated, either automatically or in response to user input, e.g., a refresh or a search.

In some examples, a query (e.g., a single word, a portion of a word, a string or words, an image, video, audio, etc.) entered in query input field 502 can be provided to server system 212 with a suggestion request. In response to the suggestion request, server system 212 can identify and suggest, based on a topic associated with the query, members of the social network that can interact with the user (for example, by implementing process 400). The user associated client device can receive suggestions 506 from server system 212, and present the suggestions in a suggestion box 508. Suggestions 506 can include interaction suggestions 506a. As noted above, interactions between members of a social network can include, among other things, real-time audio, video, text chat communications. Accordingly, interaction suggestions 506a may include, e.g. suggestions to start a video chat room with other members of the social network. Suggestions 506 can also include other types of appropriate social media suggestions (e.g., suggestions to post comments 506b and/or view another members' profile page 506c).

Figure 6:
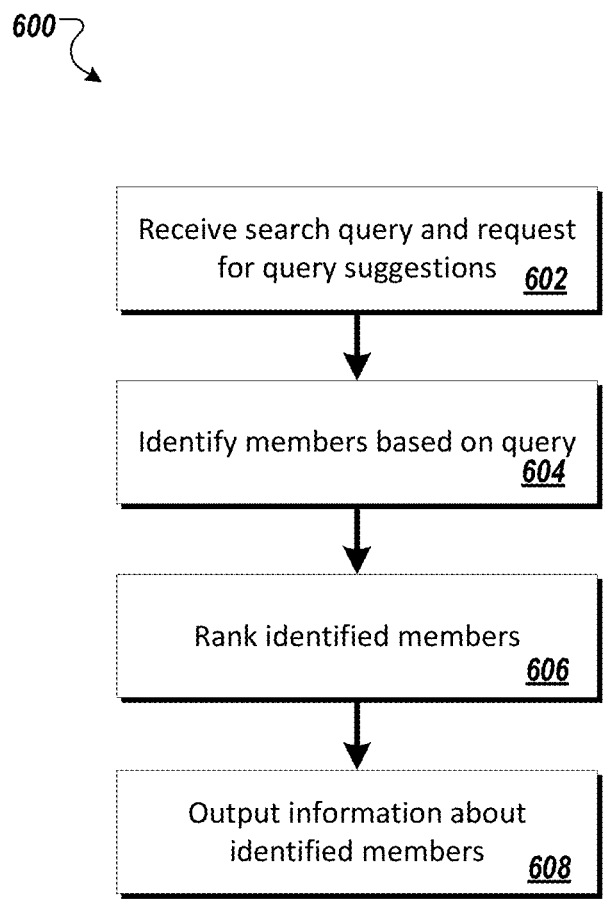
FIG. 6 is a flowchart of an example method for identifying members of a social network that are currently interacting with other members

FIG. 6 is a flowchart of an example method for identifying members of a social network that are currently interacting with other members. Process 600 may be performed by a system of one or more computers in one or more locations, appropriately programmed in accordance with this specification, e.g., by server system 212.

Process 600 receives a search query from a client device along with a request for query suggestions (602). For example, a user can submit a search query (e.g., text, images, audio, video or other content) with a request for query suggestions to a server system 212 through a network (e.g., network 200). The search query can be a completed query or a partial query. As used herein, a "partial query" may include a query input that can be augmented to form a completed query of one or more content items (e.g., words). For example, a partial query can thus be one or more keyboard inputs that define a prefix or stem of a word, an entire word or words, etc. For example, the letter "a" may be a partial query. The letter "a" may be the beginning of an "a" word, e.g., "aardvark," "Appalachia," etc. The partial query itself can also be a word, e.g., the letter "a" may be a word. Likewise, the word "New" may also be a partial query, since it can be combined with "York", "London", etc., to form other queries. Likewise, the partial query "New York" can be combined with "Mets" or "Yankees" to form other (e.g., complete) queries. When a partial query is a word stem of one or more characters ordered in a sequence, the partial query is referred to as a query stem. Typically, a query stem does not constitute a complete word, or constitutes only a word of few characters, e.g., "a" or "an". Query stems can be targeted separately from keywords, as explained below.

Based on the received search query, process 600 identifies members of a social network (604). For example, server system 212 may search an index to identify one or more member accounts that are responsive to the input search query. In some implementations, server system 212 can restrict searching of the index to member accounts that are part of the user's social graph. As noted above, a user may elect not to permit indexing and searching of their personal or private information.

Process 600 ranks the identified members (606). For example, server system 212 may rank the identified members based on a presence/status identifier associated with each member. With appropriate user permissions in place, user interaction system 311 can determine the presence/availability status of social network members, e.g., whether members are offline (e.g., not logged-in to the social networking service), currently in a chat room, and/or currently available or unavailable for chatting or other social interaction. In some examples, server system 212 may rank identified members that are currently interacting with other members of the social network (e.g., identified members who are currently in a video chat room) as being more available for social interaction than identified members who are offline or not currently interacting.

With appropriate permission in place, process 600 outputs data corresponding to information about the one or more identified members (608). For example, server system 212 can output the data to a client device associated with the user, such that the data can be displayed to the user on a Web page. In some examples, the data can be output and subsequently displayed as query suggestions (see Web page 700 of FIG. 7, for example).

Figure 7:
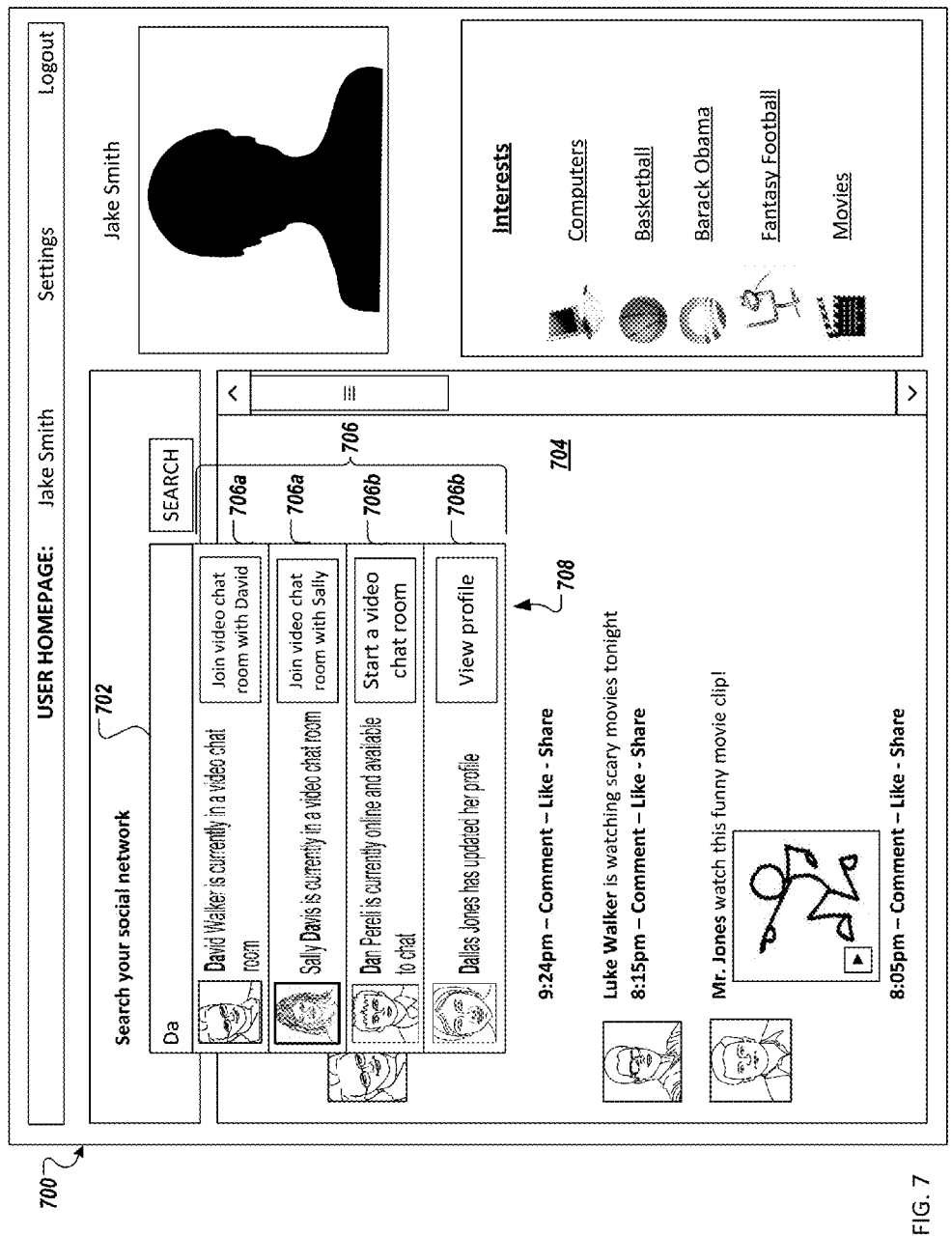
FIG. 7 illustrates a second example Web page that can be displayed on a client device associated with a user Like reference symbols in the various drawings indicate like elements.

FIG. 7 illustrates a second example Web page 700 that can be displayed on a client device associated with a user. For example, Web page 700 can be a homepage for a user accessing a social networking service. As shown, Web page 700 includes a query input field 702, which can receive queries from a user, as well as a content stream 704. In response to a partial query entered into query input field 702, server system 212 can identify and suggest members of the social network that can interact with the user (for example, by implementing process 700). The user associated client device can receive suggestions 706 from server system 212, and present the suggestions in a suggestion box 708. Suggestions 706 can include suggestions to join current interactions 706a, as well as suggestions to initiate interactions 706b. In this example, suggestions 706 are ranked based on a presence/interaction identifier, such that identified members who are currently interacting are ranked as being more available for social interaction than members who are not currently interacting.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engine described herein can be separated, combined or incorporated into a single or combined engine. The engines depicted in the figures are not intended to limit the systems described herein to the software architectures shown therein.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

The processes described herein and variations thereof contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

In some implementations, the engines described herein can be separated, combined or incorporated into a single or combined engine. The engines depicted in the figures are not intended to limit the systems described here to the software architectures shown in the figures.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

In the context of this disclosure, the terms social network and social networking service may be used interchangeably.

Other implementations not specifically described herein are also within the scope of the following claims.

What is claimed is:

1. A method performed by a server system, comprising:
   receiving a search query;
   determining a topic related to the search query;
   guiding a user who submitted the query into one or more social interactions through a social network, wherein guiding the user comprises:
   identifying, within a specific time following receipt of the search query, one or more other users of the social network who are available to interact and who are members of a group relating to the topic of the search query, wherein identifying the other users comprises:
   determining a first set of users of the social network who are associated with content relating to the topic of the search query;
   determining, from among the users of the first set, a second set of users of the social network who are members of one or more multi-member social groups relating to the topic and hosted by the social network, wherein a multi-member social group comprises a plurality of users that are connected to one another on a social graph associated with the social network, wherein the user who submitted the query has prior social interactions with the users in the second set; and determining, from among the users of the second set, a third set of users of the social network who are available to interact; and outputting, for use in augmenting a graphical user interface, data representing one or more suggestions for one or more additional social interactions to occur at a future time with one or more of the identified users with whom the user who submitted the query has previously interacted.

2. The method of claim 1, wherein determining the topic comprises performing a search of a search index using the search query to identify candidate topics relating to the search query; and selecting, as the topic, a candidate topic that is deemed to have the most relevance to the search query.

3. The method of claim 1, wherein the method further comprises ranking the users of the third set, the data corresponding to information about the identified users comprising a ranked list of the users of the third set.

4. The method of claim 3, wherein the search query is received from a first user of the social networking service; and wherein the users of the third set are ranked based on affinity of the users of the third set to the first user on a social graph of the first user.

5. The method of claim 3, wherein each of the users of the third set is part of at least one of the groups; and wherein the users of the third set are ranked based on sizes of corresponding groups.

6. The method of claim 1, wherein the data comprises data for a link to the group on the social network.

7. The method of claim 1, wherein the search query is a first search query, and the method further comprises:

outputting, for use in augmenting a graphical user interface, data corresponding to a second search query that relates to the first search query.

8. A system comprising:

a data processing apparatus; and a computer storage medium encoded with a computer program, the program comprising instructions that when executed by the data processing apparatus cause the data processing apparatus to perform operations comprising:

receiving a search query;

determining a topic related to the search query;

guiding a user who submitted the query into one or more social interactions through a social network, wherein guiding the user comprises:

identifying, within a specific time following receipt of the search query, one or more other users of the social network who are available to interact and who are members of a group relating to the topic of the search query, wherein identifying the other users comprises:

determining a first set of users of the social network who are associated with content relating to the topic of the search query;

determining, from among the users of the first set, a second set of users of the social network who are members of one or more multi-member social groups relating to the topic and hosted by the social network, wherein a multi-member social group comprises a plurality of users that are connected to one another on a social graph associated with the social network, wherein the user who submitted the query has prior social interactions with the users in the second set; and determining, from among the users of the second set, a third set of users of the social network who are available to interact; and outputting, for use in augmenting a graphical user interface, data representing one or more suggestions for one or more additional social interactions to occur at a future time with one or more of the identified users with whom the user who submitted the query has previously interacted.

9. One or more non-transitory machine-readable media storing instructions that are executable to perform operations comprising;

receiving a search query;

determining a topic related to the search query;

guiding a user who submitted the query into one or more social interactions through a social network, wherein guiding the user comprises:

identifying, within a specific time following receipt of the search query, one or more other users of the social network who are available to interact and who are members of a group relating to the topic of the search query, wherein identifying the other users comprises:

determining a first set of users of the social network who are associated with content relating to the topic of the search query;

determining, from among the users of the first set, a second set of users of the social network who are members of one or more multi-member social groups relating to the topic and hosted by the social network, wherein a multi-member social group comprises a plurality of users that are connected to one another on a social graph associated with the social network, wherein the user who submitted the query has prior social interactions with the users in the second set; and determining, from among the users of the second set, a third set of users of the social network who are available to interact; and outputting, for use in augmenting a graphical user interface, data representing one or more suggestions for one or more additional social interactions to occur at a future time with one or more of the identified users with whom the user who submitted the query has previously interacted.

10. A method performed by one or more computing devices, comprising:

receiving data relating to information about one or more users of a social network; and generating a graphical user interface to guide a first user into one or more social interactions with the one or more users through the social network, wherein generating a graphical user interface comprises:

augmenting the graphical user interface to include the information about the one or more users of the social network, the augmented graphical user interface comprising:

a field for receiving a first search query;

a first display area for displaying information relating to one or more users of a social network who are available to interact and who are members of a multi-member social group relating to a topic of the first search query and hosted by the social network, wherein a multi-member social group comprises a plurality of users that are connected to one another on a social graph associated with the social network, wherein the first user has prior social interactions with the one or more users of the social network who are available to interact; and a second display area for displaying a second search query that is related to the first search query, but that is different from the first search query, the second display area comprising a control for initiating a search based on the second search query.

11. The method of claim 10, wherein the augmented graphical user interfaces further comprises:

a third display area for displaying information relating to the first search query, and for displaying a control for adding the information to the first search query to an online profile of a user who entered the first search query.

12. The method of claim 10, wherein the first display area comprises a control for initiating an online connection to the one or more users of the social network.

13. A system comprising:

a data processing apparatus; and a computer storage medium encoded with a computer program, the program comprising instructions that when executed by the data processing apparatus cause the data processing apparatus to perform operations comprising:

receiving data relating to information about one or more members users of a social network; and generating a graphical user interface to guide a first user into one or more social interactions with the one or more users through the social network, wherein generating a graphical user interface comprises:

augmenting the graphical user interface to include the information about the one or more users of the social network, the augmented graphical user interface comprising:

a field for receiving a first search query;

a first display area for displaying information relating to one or more users of a social network who are available to interact and who are members of a multi-member social group relating to a topic of the first search query and hosted by the social network, wherein a multi-member social group comprises a plurality of users that are connected to one another on a social graph associated with the social network, wherein the first user has prior social interactions with the one or more users of the social network who are available to interact; and a second display area for displaying a second search query that is related to the first search query, but that is different from the first search query, the second display area comprising a control for initiating a search based on the second search query.

14. One or more non-transitory machine-readable media comprising instructions that are executable to perform operations comprising;

receiving data relating to information about one or more members users of a social network; and generating a graphical user interface to guide a first user into one or more social interactions with the one or more users through the social network, wherein generating a graphical user interface comprises:

augmenting the graphical user interface to include the information about the one or more users of the social network, the augmented graphical user interface comprising:

a field for receiving a first search query;

a first display area for displaying information relating to one or more users of a social network who are available to interact and who are members of a multi-member social group relating to a topic of the first search query and hosted by the social network, wherein a multi-member social group comprises a plurality of users that are connected to one another on a social graph associated with the social network, wherein the first user has prior social interactions with the one or more users of the social network who are available to interact; and a second display area for displaying a second search query that is related to the first search query, but that is different from the first search query, the second display area comprising a control for initiating a search based on the second search query.

15. The system of claim 8, wherein determining the topic comprises performing a search of a search index using the search query to identify candidate topics relating to the search query; and selecting, as the topic, a candidate topic that is deemed to have the most relevance to the search query.

16. The system of claim 8, wherein the operations further comprise ranking the users of the third set, the data corresponding to information about the identified users comprising a ranked list of the users of the third set, wherein the search query is received from a first user of the social network; and wherein the users of the third set are ranked based on affinity of the users of the third set to the first user on a social graph of the first user.

17. The machine-readable media of claim 9, wherein determining the topic comprises performing a search of a search index using the search query to identify candidate topics relating to the search query; and selecting, as the topic, a candidate topic that is deemed to have the most relevance to the search query.

18. The machine-readable media of claim 9, wherein the operations further comprise ranking the users of the third set, the data corresponding to information about the identified users comprising a ranked list of the users of the third set, wherein the search query is received from a first user of the social network; and wherein the users of the third set are ranked based on affinity of the users of the third set to the first user on a social graph of the first user.

19. The system of claim 13, wherein the operations further comprise augmenting the graphical user interface to include a third display area for displaying information relating to the first search query, and for displaying a control for adding the information to the first search query to an online profile of a user who entered the first search query.

20. The machine-readable media of claim 14, wherein the operations further comprise augmenting the graphical user interface to include a third display area for displaying information relating to the first search query, and for displaying a control for adding the information to the first search query to an online profile of a user who entered the first search query.

* * * * *